UNITED STATES PATENT OFFICE 2,137,899

TREATMENT OF CREAM

Guy W. Phelps, Raymond Bradley, and Donald C. Pierie, Chicago, Ill., assignors to Industrial Patents Corporation, Chicago, Ill., a corporation of Delaware No Drawing. Original application April 6, 1934, Serial No. 719,296. Divided and this application January 22, 1935, Serial No. 2,956. In Canada April 30, 1934

8 Claims. (Cl. 99—54)

This invention relates to a method of treating cream whereby whipping qualities may be imparted thereto.

One of the objects of the invention is to provide a method for improving the whipping qualities of whipping cream of high butter fat content.

Another object of the invention is the induction of whipping qualities into cream of relatively low butter fat content normally unsuited for whipping.

Another object of the invention is to provide a cream of improved whipping qualities.

This application is a division of our application entitled Treatment of cream, Serial No. 719,296, filed April 6, 1934.

In accordance with this invention certain glyceryl esters are added to cream which does not possess whipping properties to develop such properties.

As is well known, difficulty is experienced in whipping cream unless the cream has a relatively high percentage of butter fat. The cream normally distributed, especially prepared for this purpose, is cream having a butter fat content of 30 per cent or more.

The present invention permits the use of cream for whipping purposes such as is ordinarily sold and used as coffee cream, having a butter fat content of about 15 to 18 per cent.

We have discovered that certain organic chemicals which are slightly soluble in fats and at the same time slightly soluble in water when added to ordinary cream will modify the cream so that it will possess the property of incorporating air rapidly during whipping operations. Cream treated in accordance with the present invention and whipped to a high air content is found to be a foam of great stability. The material, which we add to the cream to secure these results, in no way affects the flavor or wholesomeness of the product.

The added material, glyceryl ester of a fatty acid having a free glyceryl alcohol group is a fragment of a fat molecule possessing one or more free alcohol groups and one or more acyl groups.

Specifically, the material may be the monoacid ester of a fatty acid and glycerol or the diacid ester of a fatty acid and glycerol or a mixture of both. Both the monoacid ester and diacid ester of glycerol and a fatty acid are esters of the alcohol "glycerol" and a fatty acid and each have a free alcohol group in each molecule.

This invention is not concerned with the preparation of the monoacid or diacid ester of a fatty acid and glycerol and it is not believed necessary to describe a particular method of preparation. This material is soluble to some extent both in oil and in water and causes the formation of extremely thin stable bubble walls.

We have in practice prepared the monoacid and diacid glycerides by the action of glycerol with natural fat or a fatty acid originating in natural fats. Preferably the monoacid or diacid glyceride may be prepared entirely from butter fats so that the finished whipping cream contains only the natural ingredients of cream. As small a quantity as one-tenth per cent of the added material is sufficient to produce marked improvement in the whipping qualities of cream and we have not found it necessary in practice to use more than one per cent to secure excellent whipping qualities in cream of relatively low butter fat content, for example, from 15 to 18 per cent. The monoacid or diacid glyceride may be added to the cream at any time before whipping. For example, a small quantity of the material may be added to cream at the time of bottling without in any way affecting the cream other than to improve its whipping properties should the consumer desire to use the cream in this manner. However, it is not necessary that the material be placed in cream any particular length of time before whipping and it may with equally satisfactory results be added to the cream just preceding or at the time of whipping.

The added material, that is, glyceryl ester of a fatty acid having a free glyceryl alcohol group, is in fact an emulsifying agent which though highly soluble in melted fat, is only slightly soluble in solidified fat and only slightly soluble in water and it is this property which renders the substance effective in improving the whipping qualities of the cream which, as is well known, is whipped while relatively cold, the distributed fat globules being therefore necessarily solidified.

The term glyceryl ester as used in the claims includes monoacid glyceryl esters, diacid glyceryl esters and mixtures of monoacid and diacid glyceryl esters.

We claim:

1. The method of whipping cream which consists in adding to cream a small amount of glyceryl ester of a higher fatty acid having a free glyceryl alcohol group and thereafter whipping the cream.

2. The method of whipping cream which consists in adding monoacid glyceride of higher fatty acids to the cream and thereafter whipping the cream.

3. The method of whipping cream which consists in adding diacid glyceride of higher fatty acids to the cream and thereafter whipping the cream.

4. The method of whipping cream which consists in adding to cream up to one per cent of glyceryl ester of a higher fatty acid having a free glyceryl alcohol group and thereafter whipping the cream.

5. The method of whipping cream which consists in adding up to one per cent of monacid glyceride of higher fatty acids to the cream and thereafter whipping the cream.

6. The method of whipping cream which consists in adding up to one per cent of diacid glyceride of higher fatty acids to the cream and thereafter whipping the cream.

7. The method of whipping cream which consists in adding to cream a small amount of monoacid glyceryl ester of higher fatty acids of butter fats and thereafter whipping the cream.

8. The method of whipping cream which consists in adding to cream a small amount of diacid glyceryl ester of higher fatty acids of butter fats and thereafter whipping the cream.

GUY W. PHELPS.
RAYMOND BRADLEY.
DONALD C. PIERIE.